United States Patent [19]

Shinmura

[11] Patent Number: 5,351,470
[45] Date of Patent: Oct. 4, 1994

[54] REINFORCING STEEL CORD FOR A TIRE FOR IMPROVING CORROSION RESISTANCE

[75] Inventor: Yasushi Shinmura, Nishinomiya, Japan

[73] Assignee: Sumitomo Rubber Industries, Ltd., Hyogoken, Japan

[21] Appl. No.: 981,392

[22] Filed: Nov. 25, 1992

[30] Foreign Application Priority Data

Nov. 28, 1991 [JP] Japan .................................. 3-340305

[51] Int. Cl.$^5$ ......................... D07B 1/06; D02G 3/48
[52] U.S. Cl. .................................. 57/213; 57/206; 57/207; 57/311; 57/902; 152/451
[58] Field of Search .............. 57/206, 207, 212, 213, 57/236, 241, 311, 902; 152/451

[56] References Cited

U.S. PATENT DOCUMENTS

| | | | |
|---|---|---|---|
| 4,158,946 | 6/1979 | Bourgois | 57/213 |
| 4,333,306 | 6/1982 | Yamashita et al. | 57/206 |
| 4,488,587 | 12/1984 | Umezawa et al. | 57/213 |
| 4,738,096 | 4/1988 | Hatakeyama et al. | 57/206 |
| 4,763,466 | 8/1988 | Ade et al. | 57/213 |
| 4,783,955 | 11/1988 | Uchio | 57/213 |
| 5,020,312 | 6/1991 | Watakabe | 57/311 X |
| 5,223,060 | 6/1993 | Imamiya et al. | 57/311 X |

*Primary Examiner*—Daniel P. Stodola
*Assistant Examiner*—William Stryjewski

[57] ABSTRACT

A steel cord for reinforcing a high polymer material has a core formed by twisting three steel core filaments having a mutually equal diameter of 0.1 to 0.35 mm, and at least one sheath formed by twisting a plurality of steel sheath filaments having a mutually equal diameter of 0.1 to 0.35 mm and arranged around the core. The three core filaments are composed of one or two waving steel filaments each having waved portions apart from a longitudinal center line thereof, and an unwaving steel filament as a remainder. The clearances (T) between the waving steel filament and the unwaving steel filament are in a range of 0.15 to 0.6 times the diameter of the steel core filament. A sum total (M) of a mean void (m) between adjoining steel sheath filaments in each sheath is in a range of 5 to 35% of a sum total (N) of a mean center distance (n) between adjoining steel sheath filaments in each sheath.

7 Claims, 6 Drawing Sheets

REINFORCING STEEL CORD FOR A TIRE FOR IMPROVING CORROSION RESISTANCE

The present invention relates to a steel cord suitably used as a cord for reinforcing a tire, which can improve corrosion resistance by making easy penetration of high polymer material into the cord.

BACKGROUND OF THE INVENTION

In products consisting of high polymer material such as rubber and plastics for example, there are cases in which reinforcing cords are embedded in the high polymer material in order to increase the strength of such products. Particularly in a pneumatic tire used for heavy duty vehicles and construction vehicles, steel cords are used in many cases as carcass cords, belt cords, and bead cords and the like in order to increase the tire rigidity and to support large tire loads.

As a steel cord of this kind, a cord having what is called a twisted layer structure, which is generally formed by twisting in order a sheath $Bi$ ($i=1, 2 \ldots$) comprising a plurality of filament f on the outside of a core A formed by twisting three filaments f, as shown in FIG. 8. The reason for advantages of such cord is that the bending rigidity of the cord is uniform and the diameter of the cord is smaller because the filaments f are compactly twisted and the filaments of the core A forms a triangular configuration to stably maintain the filament arrangement with respect to the bending deformation.

However, in the steel cord having such a structure, the filaments f adjoining in each sheath $Bi$ are in close proximity to each other, and permeability of rubber during tire vulcanization is lowered causing these three filaments f to come in close contact in the core A in particular. Therefore, a void H is formed at the center of the core A where rubber does not enter.

As a result of this, the air remaining in the void H expands due to the heat generated in the tire, causing localized distortion. In addition, the moisture, etc. contained in the remaining air and the moisture, etc. entering from a damaged portion of the tire is diffused in the void H, thereby causing tire durability to be deteriorated considerably due to resultant corrosion and damage of the tire.

SUMMARY OF THE INVENTION

It is hence a primary object of the invention to provide a steel cord which is able to ensure the permeation of high polymer material such as rubber without spoiling the characteristics of the cord and to solve the above-notementioned problems.

According to one aspect of the present invention a steel cord for reinforcing a high polymer material has a core formed by twisting three steel core filaments having a mutually equal diameter of 0.1 to 0.35 mm, and at least one sheath formed by twisting a plurality of steel sheath filaments having a mutually equal diameter of 0.1 to 0.35 mm and arranged around the core. The three core filaments are composed of one or two waving steel filaments each having waved portions apart from a longitudinal center line thereof, and an unwaving steel filament as a remainder. The clearances T between the waving steel filament and the unwaving steel filament are in a range of 0.15 to 0.6 times the diameter of said steel core filament. A sum total M of a mean void m between adjoining steel sheath filaments in each sheath is in a range of 5 to 35% of a sum total N of a mean center distance n between adjoining steel sheath filaments in each sheath.

One or two of the three steel filaments comprising a core employs a waving steel filament. The waving steel filament has waved portions forming a wavy line or a spiral line, which is apart from the longitudinal center line thereof. Therefore, when the waving steel filament and an unwaving steel filament are twisted to each other, these filaments repeatedly contact and non-contact in a core. Further, because the gap between the steel filaments in each sheath is increased, it is possible to ensure the permeation of high polymer material such as rubber into the cord, especially in the middle of the core, thereby improving corrosion resistance and preventing distortion and deteriorated of strength caused by the air remaining in the core air.

In addition, because the steel filament of the core has a portion which comes into contact with each other, it is possible for the steel filaments to maintain a stable triangular configuration. Further, for example, it is possible to prevent an open cord from remarkably increasing the elongation percentage in low load range. As a result, the cord in this invention can demonstrate the stability of elastic characteristics and uniformity of bending rigidity as well as a steel cord having a conventional structure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the are from this detailed description.

BRIEF DESCRIPTION OF THE DRAWINGS

An embodiment of the present invention will now be described by way of example, referring to the attached drawings which are given by way of illustration only, and thus are not limitative of the present invention, and in which:

FIG. 7 is a cross-sectional view of a steel cord describing a mean void and the like.

DETAILED DESCRIPTION OF THE INVENTION

Figure 1:
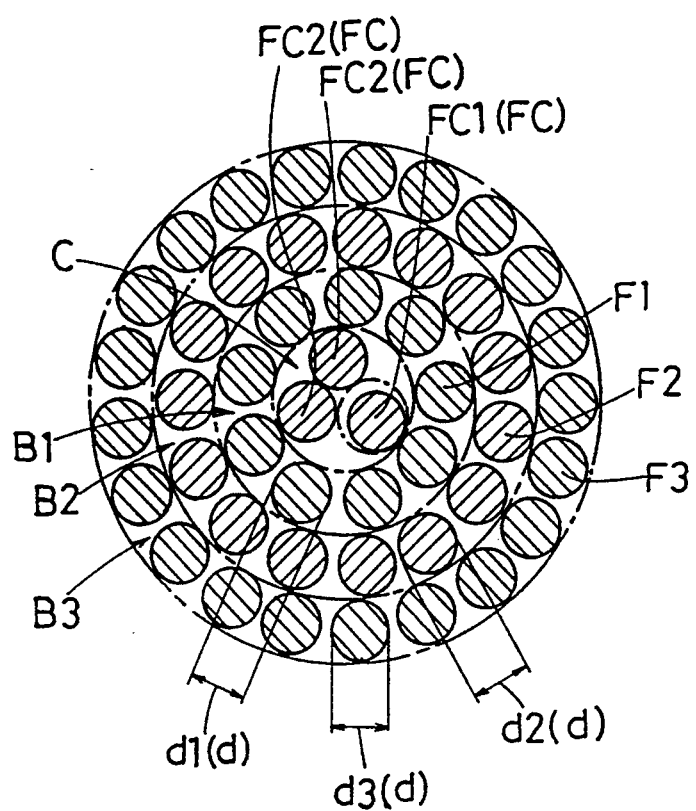
FIG. 1 is a cross-sectional view of a steel cord showing an embodiment of the present invention.

The steel cord 1 dealt with in this embodiment is structured by four twisted layer of steel filament having a diameter d of 0.1 to 0.35 mm. As shown in FIG. 1, a first sheath B1, a second sheath B2 and a third sheath B3 are arranged in that order around the core C forming a center layer.

Figure 2:
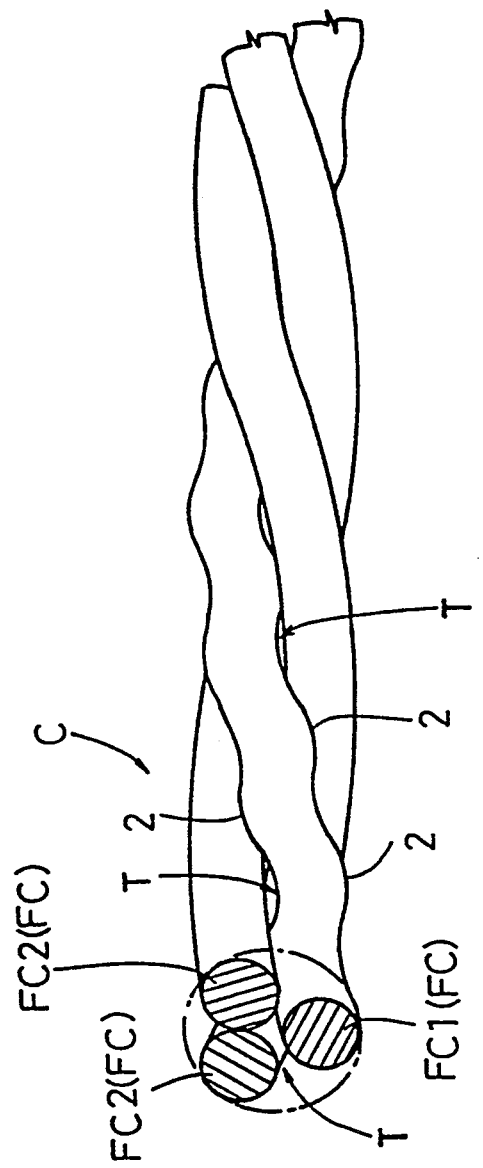
FIG. 2 is a perspective diagram showing a core.

As shown in FIG. 2, the core C is formed by twisting three steel filaments FC each having the same diameter. A waving steel filament FC1 is used for one or two filaments and an unwaving steel filament FC2 is used for the remaining steel filament respectively.

Figure 6:
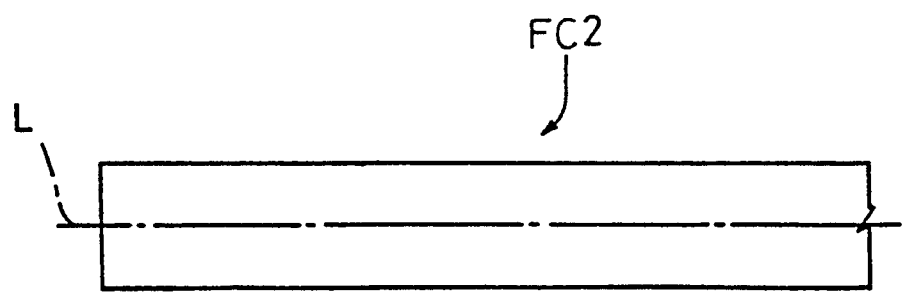
FIG. 6 is a plan view showing an unwaving steel filament.

The unwaving steel filament FC2 denotes a conventional linear filament extending along the longitudinal center line L thereof before twisting, as shown In FIG. 6.

Figure 3:
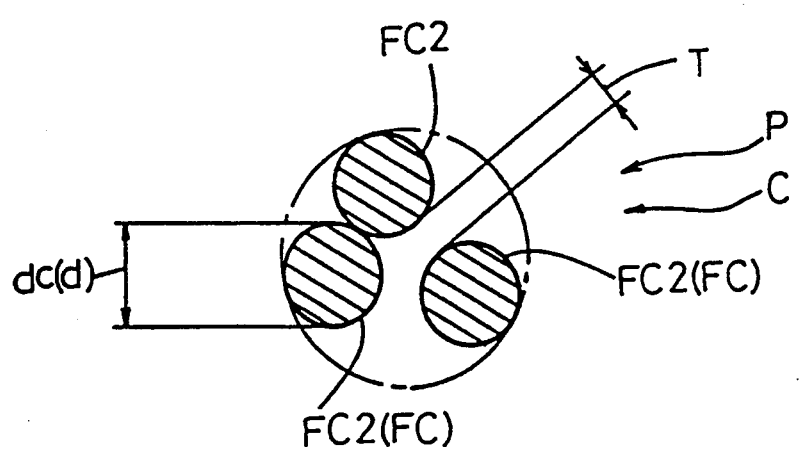
FIG. 3 is a cross-sectional view showing a core in the non-contact portion.
Figure 4:
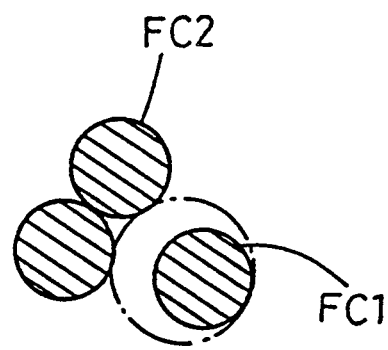
FIG. 4 is a cross-sectional view showing other example of the core.
Figure 5:
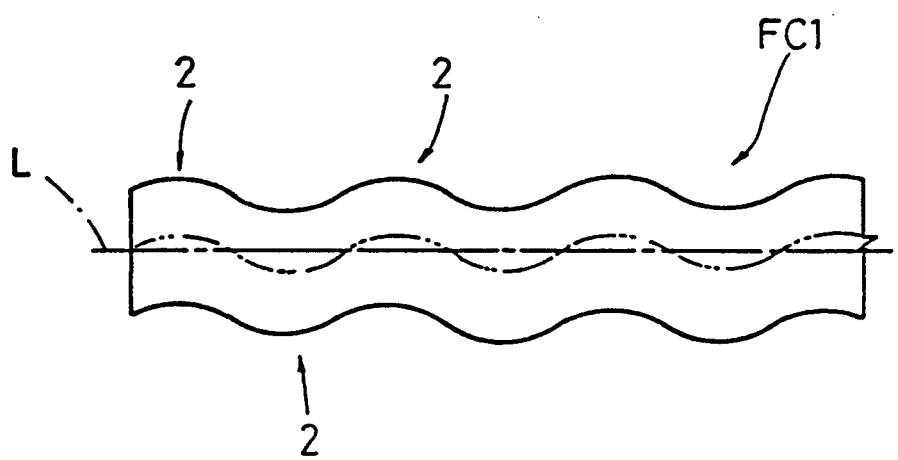
FIG. 5 is a plan view showing an example of a waving steel filament.

Also, the waving steel filament FC1 is, as shown in FIG. 5, a waving filament which is provided with a corrugating process and has waved portions 2 repeated at a small pitch so as to make a wavy line. The waved portion 2 is apart outwardly from the longitudinal center line L of the filament. Therefore, when the waving steel filament FC1 and the unwaving steel filament FC2 are twisted to each other, contact and non-contact are repeated between the filaments FC1 and FC2. Therefore, as shown in FIG. 3, the core C forms a clearance T, into which a high polymer material such as rubber can permeate, between the waving steel filament FC1 and the unwaving steel filament FC2 at the non-contacting portion P. A steel filament formed into a spiral may be used for the waving steel filament FC1, and in such a case, the waved portion 2 is formed by one pitch's spiral element. In particular, when the waved portions 2 are arranged symmetrically with respect to the longitudinal center line L, such as in the spiral form, it is possible to provide the core C with a regular clearance T of the same type (FIG. 4).

On the other hand, the contacting portion Q of the core C restricts the deformation due to reduced diameter under a load, prevents particularly an increase in elongation percentage in a low load range (0 to 5 kg), and demonstrates stable elastic characteristics. In order to cause the core C to demonstrate such effect, it is necessary to set the clearance T in a range of 0.15 to 0.6 times the diameter dc of the filament FC in the core C. When the clearance T is smaller than 0.15 dc, the permeability becomes insufficient, and when the clearance T is greater than 0.6 dc, for example, the elongation percentage exceeds 0.3% under a 5 kg load, and the dimensional stability in a low load range is lowered, thereby making it difficult to obtain stable elastic characteristics.

The first sheath B1 is formed by a plurality (N1) of steel filament F1 having a mutually equal diameter d1 and arranged in a line to surround the core C.

Likewise, the second sheath B2 is formed by a plurality (N2) of steel filament F2 arranged in a line to surround the first sheath B1 and having a diameter d2. The third sheath B3 is formed by a plurality (N3) of the steel filament F3 arranged in a line to surround the second sheath B2 and having a diameter d3. As the steel filaments F1, F2, F3, the unwaving filaments are respectively used.

It is desirable that the diameter of each steel filament is made to exceed the diameter of the steel filament arranged inside thereof. That is:

$$dc \leq d1 \leq d2 \leq d3 \tag{1}$$

Further, it is desirable that the diameter of the steel filament in the innermost layer is made to be smaller than the diameter of the steel filament in the outermost layer. That is:

$$dc < d3 \tag{2}$$

More preferably, the diameter dc,d1,d2,d3 are $$dc < d1 < d2 < d3 \tag{3}$$

As a result of this, it is possible to effectively improve the bending modulus of elasticity of the cord.

With respect to the number of the filaments N1, N2, N3, N1 is selected from 6 to 9, N2 is selected from 12 to 15, and N3 is selected from 15 to 21, respectively. By selecting the number of filament and by setting the diameter dc to d3 according to the above mentioned expressions (1) and (2), or (3), the sum total M of the mean void m between respectively adjoining steel filaments in each sheath B is made to be 5 to 35% of the sum total N of the mean center distance n between the adjoining filament. Because the mean void m of each sheath is increased, it is possible to ensure that rubber and the like permeates inside of each sheath B and enters inside of the core C.

The mean void m and the mean center distance n will now be described using the first sheath B1.

Figure 7:
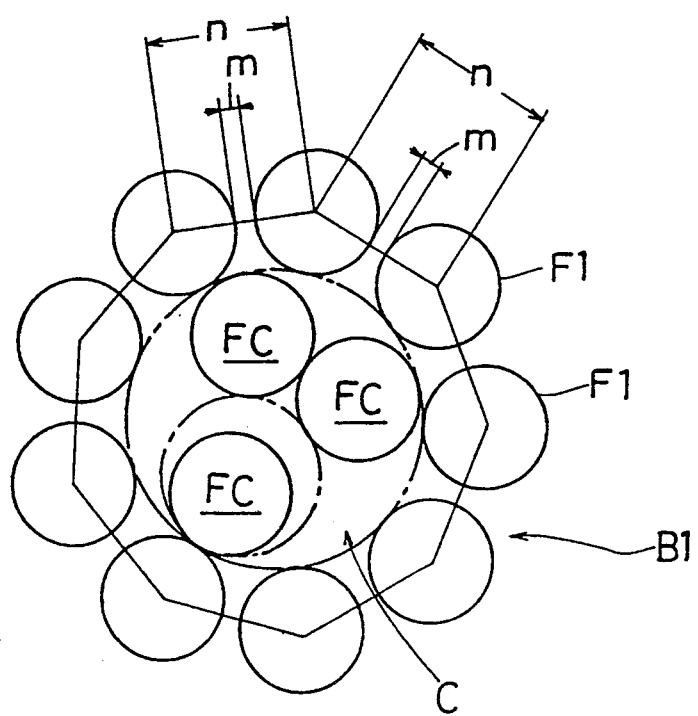
Figure 8:
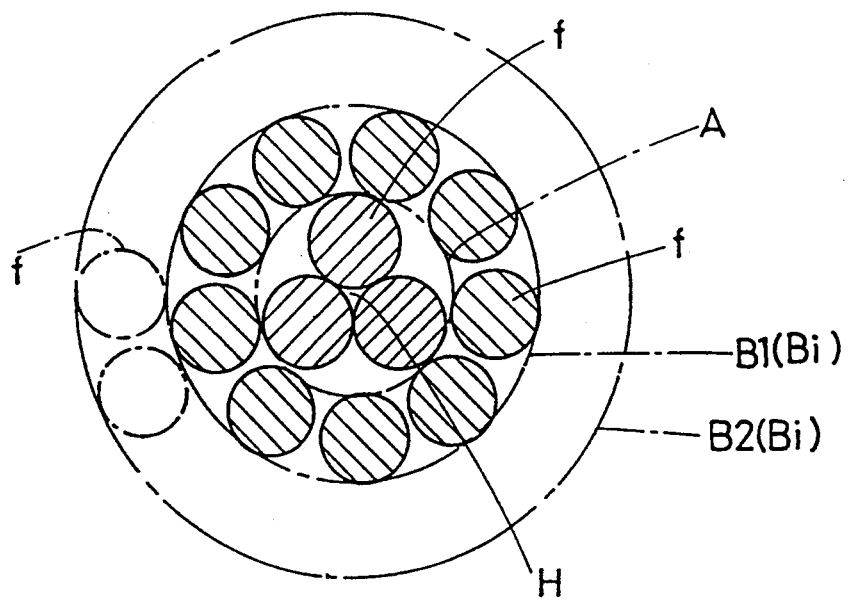
FIG. 8 is a cross-sectional view describing a prior art core.

That is, as shown in FIG. 7, the mean void m means a void between mutually adjoining steel filament F1, F1 when all the steel filament F1 for the first sheath B1 are uniformly arranged around the core C. The mean center distance n means the distance between the center of mutually adjoining steel filament F1 and F1 in such a uniform arrangement as described above.

That is, in the present invention, because the waving steel filament FC1 is used in the core C, it is difficult to arrange the steel filament in a true circle around the core C. Therefore, what is called the pitch circle of the sheath B is considered as a polygonal body connecting the centers of each steel filament, and the ratio M/N is given instead of the proportion of the void with respect to the overall circumferential length of the pitch circle.

When the sum total M is smaller than 5% of the sum total N, the permeability of the sheath becomes insufficient. When the sum total M is greater than 35% of the sum total N, the steel filament is shifted largely within the sheath, affecting the stability of the structure of the cord. Therefore, the range of the sum total M is preferably between 10 to 20% of the sum total N.

Also, the steel cord 1 may be formed by twisting each steel filament FC, F1, F2, F3 respectively into the same direction for example, and the number of twist per unit length may be increased in order from the inside layer to the outside layer. By twisting the steel filament into the same direction in a manner as stated above, it is possible to reduce the intersecting angle of the adjoining steel filament inside and outside of radial direction, to reduce the contact pressure of each steel filament, and to restrict the cord breakage due to fretting and the like.

It should be noted that the steel cord 1 according to the present invention is not limited to the four layer structure shown in this embodiment but the number of the sheath B can be freely set to the layer structure such as a two layer structure, a three layer structure and further to a five layer structure.

EXAMPLE

A steel cord is formed in accordance with the specification shown in Table 1 and the air permeability of each steel cord was compared. Each steel cord is covered with topping rubber and formed into a tire. After vulcanizing, certain length of the steel cord with rubber adhered thereto is cut off from the tire, the cut off steel cord is enclosed with rubber, air pressure of 1 kg/cm² is applied for one minute from one end to the other end of the steel cord, and the air permeability was measured at the other end. The result of measurement is indicated by an index with the example 1 as 100. The smaller the numerical value, the more rubber which permeates into the cord.

TABLE 1

|  | Embodiment 1 | Embodiment 2 | Embodiment 3 | Embodiment 4 | Embodiment 5 | Comparison 1 | Comparison 2 | Comparison 3 | Comparison 4 | Comparison 5 |
|---|---|---|---|---|---|---|---|---|---|---|
| Core | | | | | | | | | | |
| *Filament diameter (dc) mm | 0.175 | 0.175 | 0.175 | 0.175 | 0.175 | 0.175 | 0.175 | 0.175 | 0.175 | 0.175 |
| *Number of filament pcs | 3 | 3 | 3 | 3 | 3 | 3 | 3 | 3 | 3 | 3 |
| *(Number of waving filament) pcs. | 1 | 1 | 1 | 1 | 1 | 0 | 0 | 0 | 0 | 0 |
| First sheath | | | | | | | | | | |
| *Filament diameter (d1) mm | 0.175 | 0.175 | 0.175 | 0.175 | 0.175 | 0.175 | 0.175 | 0.175 | 0.175 | 0.175 |
| *Number of filament (N1) pcs. | 9 | 6 | 9 | 9 | 8 | 9 | 8 | 9 | 8 | 9 |
| Second sheath | | | | | | | | | | |
| *Filament diameter (d2) mm | — | 0.175 | 0.175 | 0.175 | — | — | — | 0.175 | 0.175 | 0.175 |
| *Number of filament (N2) pcs. | — | 15 | 15 | 13 | — | — | — | 15 | 13 | 15 |
| Third sheath | | | | | | | | | | |
| *Filament diameter (d3) mm | — | — | — | 0.175 | 0.175 | — | — | — | — | 0.175 |
| *Number of filament (N3) pcs. | — | — | — | 21 | 18 | — | — | — | — | 21 |
| Air permeability (Index) | Approx. 0 | Approx. 0 | Approx. 0 | 2 | Approx. 0 | 100 | 2 | 100 | 2 | 100 |

I claim:

1. A steel cord for reinforcing a polymer material comprising:
   a core formed by twisting three steel core filaments having a mutually equal diameter of 0.1 to 0.35 mm; and
   at least one sheath formed by twisting a plurality of steel sheath filaments having a mutually equal diameter of 0.1 to 0.35 mm and arranged in a line around the core so as to surround the core, wherein said three steel core filaments are composed of
   at least one waving steel filament, each filament having waved portions apart from a longitudinal center line thereof and repeated in the longitudinal direction, and
   remaining filaments being an unwaving steel filament and having clearance portions (T) and contact potions formed between said at least one waving steel filament and said unwaving steel filament by said waved portions;
   said steel sheath filaments being composed of unwaving steel filament;
   said clearance portions (T) being in a range of 0.15 to 0.6 times the diameter of said steel core filament; and
   a sum total (M) of a mean void (m) between adjoining steel sheath filaments in each sheath being in a range of 5 to 35% of a sum total (N) of a mean center distance (n) between adjoining steel sheath filaments in each sheath.

2. The steel cord according to claim 1, wherein when a plurality of sheaths are provided around said core, a diameter of the steel sheath filament is not smaller than a diameter of the steel sheath filament of the inside sheath and the steel core filament.

3. The steel cord according to claims 1, wherein the steel filaments of the at least one sheath are larger in diameter than the diameters of the steel core filament.

4. The steel cord according to claim 3, wherein a plurality of sheaths are provided around said core and wherein the diameter of the steel sheath filaments increases as the sheaths are farther from the core.

5. The steel cord according to claim 1, wherein a plurality of sheaths are provided around said core and wherein the diameter of the steel sheath filaments increases as the sheaths are farther from the core.

6. The steel cord according to claim 5, wherein the steel core filaments are smaller in diameter that the diameters of the steel sheath filaments.

7. The steel cord according to claim 1, wherein an outermost sheath has steel filaments with diameters which are larger than diameters of the steel core filaments.

* * * * *